United States Patent [19]

Fuchs et al.

[11] Patent Number: 4,927,542
[45] Date of Patent: May 22, 1990

[54] ELIMINATION OF HYDROXYLAMMONIUM SALTS FROM WASTEWATERS CONTAINING SUCH SALTS

[75] Inventors: Hugo Fuchs, Lugwigshafen; David Agar, Rimbach, both of Fed. Rep. of Germany

[73] Assignee: BASF Aktiengesellschaft, Ludwigshafen, Fed. Rep. of Germany

[21] Appl. No.: 410,044

[22] Filed: Sep. 19, 1989

[30] Foreign Application Priority Data

Oct. 6, 1988 [DE] Fed. Rep. of Germany ....... 3834030

[51] Int. Cl.$^5$ .............................................. C02F 1/58
[52] U.S. Cl. ...................................... 210/711; 210/713; 210/721; 210/763
[58] Field of Search .............. 210/710, 711, 712, 713, 210/721, 758, 761–763, 765, 908, 903

[56] References Cited

U.S. PATENT DOCUMENTS

| 4,147,623 | 4/1979 | Koff et al. | 210/31 R |
| 4,246,105 | 1/1981 | Rohrer | 210/763 |
| 4,549,969 | 10/1985 | Gerlach et al. | 210/763 X |
| 4,696,749 | 9/1987 | Habermann et al. | 210/721 |

FOREIGN PATENT DOCUMENTS 58-34092 2/1983 Japan .

OTHER PUBLICATIONS

Berichte der Deutschen Chemischen Gesellschaft, vol. 33, (1900), p. 36.

Primary Examiner—Thomas Wyse
Attorney, Agent, or Firm—Keil & Weinkauf

[57] ABSTRACT

Hydroxylammonium salts are eliminated from wastewaters containing such salts by a process which comprises treating a wastewater containing such salts with not less than 0.5 mole of manganese (IV) oxides per mole of hydroxylamine in the form of hydroxylammonium salts at a pH of from 1 to 4 and at from 10° to 100° C.

4 Claims, No Drawings

ELIMINATION OF HYDROXYLAMMONIUM SALTS FROM WASTEWATERS CONTAINING SUCH SALTS

In the preparation of hydroxylammonium salts or the further processing of these salts, it is often impossible to avoid the occurrence of wastewaters containing hydroxylammonium salts. Since such wastewaters are unacceptable for biological wastewater treatment plants, it is necessary to eliminate these salts from the wastewaters.

U.S. Pat. No. 4,147,623 discloses a process in which solutions of hydroxylammonium salts are first brought to pH of 6–11 and then passed through a cation exchanger. This process has the disadvantage that the cation exchangers are relatively rapidly exhausted and reliable removal of hydroxylammonium salts is thus not ensured and, on the other hand, that the elution of the spent cation exchangers results in dilute hydroxylammonium salt solutions, which in turn have to be treated.

Japanese Preliminary Published Application 58/034092 describes a process in which special bacteria are first cultured in the presence of $Fe^{2+}$ ions, hydroxylamine-containing solutions are mixed with the bacteria culture and aerated and the spent bacteria culture is then separated off by decanting. Because of fluctuating concentrations of hydroxylammonium salts, absolutely reliable treatment is not guaranteed.

Berichte der deutschen chemischen Gesellschaft, 33 (1900), 36 discloses that acidified hydroxylammonium salt solutions are decomposed by adding finely divided manganese superoxide hydrate. The way in which wastewaters are to be treated is not described.

It is an object of the present invention to provide a process for eliminating hydroxylammonium salts from wastewaters, which, regardless of the concentration of hydroxylammonium salts in the wastewaters, ensures reliable elimination of the said salts and can be carried out in a simple manner.

We have found that this object is achieved by a process for eliminating hydroxylammonium salts from wastewaters containing such salts by treatment with excess manganese(IV) oxides at acidic pH, wherein the treatment is carried out at a pH of from 1 to 4 and at from 10 to 100° C. using not less than 0.5 mole of manganese(IV) oxides per mole of hydroxylamine in the form of hydroxylammonium salts.

The novel process has the advantages that it can be carried out easily by a continuous method, the hydroxylammonium salts are destroyed reliably in a simple manner and the manganese oxides used are readily recoverable.

The wastewaters to be treated contain hydroxylammonium salts, for example salts of strong mineral acids, for example sulfuric acid, nitric acid hydrochloric acid, or lower fatty acids, for example those of not more than 4 carbon atoms. The level of hydroxylammonium salts is, as a rule, not more than 30, in particular from 0.01 to 20, % by weight. In addition to hydroxylammonium salts, solutions to be treated may also contain other alkali metal or ammonium salts of the stated acids. The process has proven particularly useful for the treatment of hydroxylammonium sulfate solutions and/or hydroxylammonium ammonium sulfate solutions which also contain ammonium sulfate and/or sulfuric acid. A typical solution contains, for example, from 0.05 to 5% by weight of hydroxylammonium ammonium sulfate and from 0.5 to 25% by weight of ammonium sulfate.

Manganese(IV) oxides, such as manganese dioxide or manganese dioxide hydrate, are used for the treatment. Freshly prepared manganese dioxide, for example having a particle size of from 0.1 to 10 mm, has proven particularly suitable. Manganese(IV) oxide can also be deposited on a carrier, such as silica or silicates, in particular silica, such as kieselguhr, before use. Such supported catalysts advantageously contain from 20 to 60% by weight, based on the active material and carrier, of manganese dioxide.

Not less than 0.5 mole of manganese(IV) oxide is used per mole of hydroxylamine in the form of hydroxylammonium salts. Advantageously, an excess of from 2 to 10 moles of manganese(IV) oxide is maintained.

The treatment is carried out at pH of from 1 to 4, in particular from 1 to 3. Furthermore, a temperature of from 10 to 100° C., in particular from 20 to 50° C., is maintained during the process.

It has also proven useful to maintain a residence time of from 0.1 to 120, in particular from 1 to 20, minutes.

In an advantageous procedure, manganese dioxide is arranged in a treatment zone, for example a tubular treatment zone, and the solution to be treated is passed through from the bottom to the top or from the top to the bottom, manganese dioxide being added at the rate at which it is consumed.

The solution treated in this manner is advantageously treated with alkaline agents, such as alkali metal or alkaline earth metal hydroxides, for example sodium hydroxide or calcium hydroxide, and manganese hydroxide is precipitated at a pH greater than 7, for example from 8 to 10, separated off by decanting or filtration and converted back into manganese dioxide by oxidation with a gas containing molecular oxygen, for example air. The manganese dioxide obtained is used again for the treatment of the wastewaters.

The Examples which follow illustrate the invention.

EXAMPLE 1

A glass tube having a diameter of 35 mm and a length of 400 mm and provided at the lower end with a frit was charged with 100 g of manganese dioxide in the form of 1.5 mm extrudates. 500 ml/hour of wastewater containing hydroxylammonium sulfate, having a pH of 2.9, was passed downward through the tube at 25° C., and thus through the manganese dioxide. The wastewater used contained 0.77 g/l of hydroxylammonium sulfate, calculated as hydroxylamine.

The water emerging from the glass tube had a pH of 3.3 and contained 690 mg/l of manganese; hydroxylamine was no longer detectable. Manganese hydroxide was precipitated from the resulting wastewater by adding sodium hydroxide solution until the pH reached 10. The precipitate was filtered off and oxidized with atmospheric oxygen back to manganese dioxide, which was reusable. The filtrate contained 1 mg/l of manganese.

EXAMPLE 2

The procedure described in Example 1 was followed, except that wastewater containing 11.2 g/l of hydroxylammonium sulfate, calculated as hydroxylamine, and having a pH of 2.1 was used. The treated wastewater was free of hydroxylamine and had a pH of 3.5. After precipitation of manganese hydroxide at pH 10 and filtration, the filtrate contained 3 mg/l of manganese.

We claim:

1. A process for eliminating hydroxylammonium salts from wastewaters containing such salts, which comprises treating a wastewater containing hydroxylammonium salts with not less than 0.5 mole of manganese(IV) oxides per mole of hydroxylamine in the form of hydroxylammonium salts at a pH of from 1 to 4 and at from 10 to 100° C.

2. A process as claimed in claim 1, wherein a residence time of from 0.1 to 120 minutes is maintained.

3. A process as claimed in claim 1, wherein the wastewater is passed through a treatment zone charged with manganese(IV) oxide, and manganese(IV) oxide is added at the rate at which it is consumed.

4. A process as claimed in claim 1, wherein an alkaline agent is added to the wastewater treated in this manner and manganese hydroxide is precipitated at a pH of >7, separated off and then oxidized with a gas containing molecular oxygen to manganese(IV) oxide, which is recycled.

* * * * *